US006705337B1

(12) United States Patent
Peckham

(10) Patent No.: US 6,705,337 B1
(45) Date of Patent: Mar. 16, 2004

(54) TRUCK COVER

(76) Inventor: Barbara Peckham, 1917 Business 340 W., Stanley, VA (US) 22851

(*) Notice: Subject to any disclaimer, the term of this patent is extended or adjusted under 35 U.S.C. 154(b) by 0 days.

(21) Appl. No.: 10/443,684

(22) Filed: May 21, 2003

(51) Int. Cl.[7] .............................................. E04H 15/06
(52) U.S. Cl. .............................. 135/88.07; 296/136.11; 150/168
(58) Field of Search ................................. 135/87, 88.01, 135/88.03, 88.05, 88.07, 88.16, 96, 119; 296/95.1, 136.01, 136.07, 136.1, 136.11; 150/166, 168

(56) References Cited

U.S. PATENT DOCUMENTS

| | | | |
|---|---|---|---|
| 2,849,012 A | * 8/1958 | Cohen et al. | ............ 135/88.07 |
| 2,874,709 A | 2/1959 | Cohen et al. | |
| 3,343,556 A | 9/1967 | Stamberger et al. | |
| 4,799,728 A | * 1/1989 | Akers et al. | ........... 296/136.04 |
| 4,842,324 A | * 6/1989 | Carden | .................. 296/136.11 |
| 4,863,210 A | * 9/1989 | Kenon | .................... 296/136.11 |
| 5,240,305 A | * 8/1993 | Trethewey | ............. 296/136.11 |
| 5,244,246 A | * 9/1993 | Cunningham | .......... 296/136.11 |
| 5,328,230 A | * 7/1994 | Curchod | ................ 296/136.04 |
| 5,490,707 A | * 2/1996 | De La Cruz | ............... 296/95.1 |
| 5,497,819 A | * 3/1996 | Chiang | ........................ 150/166 |
| 5,791,361 A | 8/1998 | Chong | |
| 5,816,310 A | * 10/1998 | Wu | ........................ 160/370.21 |
| 5,816,641 A | * 10/1998 | Chen | .......................... 296/95.1 |
| 5,915,399 A | 6/1999 | Yang | |
| 6,318,393 B1 | 11/2001 | Glasgo | |
| 6,394,528 B2 | * 5/2002 | Hoenack | ................ 296/136.01 |

FOREIGN PATENT DOCUMENTS

| | | |
|---|---|---|
| GB | 2337734 | * 12/1999 |
| JP | 5-294146 | * 11/1993 |

OTHER PUBLICATIONS

"Truck Cab Covers", Cab Coolers, www.aplusseatcovers.com/cab_cover.html, Jun. 2001, 2 pages.*

* cited by examiner

Primary Examiner—James O. Hansen
(74) Attorney, Agent, or Firm—Law Office of Vincent G. LoTempio; Vincent G. LoTempio; Philip B. Abramowitz

(57) ABSTRACT

A truck cover having a roof panel having a front edge, a rear edge, and two side edges and a front section attached to the front edge of the roof panel for covering the truck windshield. The cover includes a rear panel attached to the rear edge of the roof panel for covering the truck's rear window. Attached to the side edges of the roof are two side sections for covering the vehicle's side windows, the side sections have a lower edge, a front corner and a back corner. The device includes two elastic strips. Each elastic strip has a first end and a second end. The first end of each of the elastic strips is individually attached to the lower edge of each of the side sections proximate the front corner. The second end of each strip is attached to the lower edge of each of the side sections proximate the back corner for detachably attaching the truck cover to the cab of a truck.

5 Claims, 3 Drawing Sheets

TRUCK COVER

FIELD OF THE INVENTION

The present invention relates to a temporary vehicle cover, and, more particularly, pertains to a truck cab cover that is easy to attach and remove and is also readily storable.

BACKGROUND OF THE INVENTION

During periods of inclement weather, such as a snowstorm, extreme heat, or rainstorms, there are times when a vehicle may be exposed to the elements. Often snow and ice collects on the windshield of a vehicle or truck and must be removed prior to operating the vehicle to enable a driver to see out of the windows while driving. Snow and ice removal is time-consuming and difficult. In addition, a vehicle or truck may be exposed to direct sunlight causing the interior to overheat during the absence of the driver, thus making the vehicle uncomfortable upon return.

A flexible cover can be used to protect the cab of a compact truck from the elements. Typically a cover is placed on a vehicle during the time it will be sitting in the sun, snow, ice rain and other elements for an extended period of time. The problem however with existing vehicle covers is the inability to easily fit a multiplicity of different sized and shaped vehicles. In addition, the existing devices suffer from being unmanageable and difficult to mount onto a vehicle and difficult to remove and store.

There are many examples of vehicle covers in the prior art. By way of example, U.S. Pat. No. 2,874,709 to Cohen et. al. shows a vehicle cover comprised of two pieces comprised of a top portion with snaps or a zipper that attaches the top piece to the lower portion. The lower portion offers protection to the windows of the vehicle. This design is not advantageous because it is cumbersome to snap or zipper the lower portion to the upper portion.

A flexible sheet vehicle cover is illustrated in U.S. Pat. No. 3,343,556 to Stamberger et. al. This vehicle cover is comprised of a flexible canvas sheet with elastic spacers that rest on the roof of the vehicle. The cover traverses the length of the vehicle and attaches, by way of clamps, at both the front and rear of the vehicle underneath the bumper. The patent also discloses curtains positioned to the side of the cover, meant to protect the windows of the automobile. The problem with this design is that the spacers are not easy to attach and the cover is cumbersome and difficult to store.

U.S. Pat. No. 5,791,361 to Chong discloses a vehicle cover which protects the roof, front and rear windows, and the side windows of a vehicle. This cover attaches to the vehicle by way of suction cups and fasteners that attach to the windshield wipers. The cover also has openings so as to allow the doors to open and close with the cover on. Beneath the exterior vehicle cover is a mosquito meshing material so as to allow for ventilation. Again the problem with this design is that it is time-consuming to attach the device to a vehicle. It is also difficult to attach because suction cups do not readily adhere to unclean surfaces.

Another vehicle cover is disclosed in U.S. Pat. No. 5,915,399 to Yang, which describes a vehicle cover for the entire vehicle. The objective of this invention is to allow someone to use the automobile for sleeping in during camping excursions. This design allows the cover to protect the vehicle from the elements in extreme weather conditions. The vehicle cover is one large unit, having an elastic band at the bottom of the cover to secure it to the vehicle. The vehicle cover disclosed in this patent is difficult to place onto the vehicle because of its unmanageably large size. More than one person would be required to attach and remove the cover.

U.S. Pat. No. 6,318,393 to Glasgo discloses a thermoplastic vehicle cover. This cover is a single unit that has a main panel that covers the roof of the vehicle. This main portion is hallowed out such that side, front, and back plastic panels can slide in and out of the main portion. To cover the vehicle, the main portion is placed on the roof, the front and rear portions slide out, along with the side portions. The side portions are also hollowed and both have a front and rear panel that slide out of the side plastic panels. These additional panels serve to further cover and protect the vehicle. This configuration opens up the possibility of ice and snow entering the hollowed out area. This will make the sliding of the panels difficult, if not impossible. Also, the thermoplastic vehicle cover is heavy and because it isn't pliable, it is impossible to simply shake snow off the top of the cover, for example.

A significant deficiency with the previous developed solutions, as well as many other similar devices, is that they do not provide a vehicle cover that is easily attached and removed to various sized and shaped vehicles, and readily stored while not in use. The present invention satisfies the above-mentioned needs, as well as others, and overcomes the deficiencies in devices heretofore developed.

SUMMARY AND OBJECTS OF THE INVENTION

The present invention generally comprises a vehicle cover that attaches to a multiplicity of sized and shaped cabs of a compact truck, that is easy to mount and attach, and is easy to remove and store.

A general objective of this invention is to provide a cover that will protect a vehicle from snow, ice, rain, as well as direct sunlight and its damage to the interior of the vehicle, and other extreme weather condition elements.

Another objective is to provide a cover that is easy to attach, and remove and is also readily storable.

Still another objective is to ensure that the truck cover securely fastens to the vehicle so as to prevent the vehicle cover from slowing away in the wind, and accommodates various custom appointments, for example mirror sizes and shapes.

Still a further object of the present invention is to provide a truck cover that is made of a material that is lightweight and easy to manufacture.

A further object of the present invention is to provide a truck cover that can act as a sunshade and a frost cover that can easily be cleaned of accumulated water or snow after use.

The above and other objects are accomplished in accordance with the present invention which comprises vehicle cover comprising: A truck cover having a roof panel having a front edge, a rear edge, and two side edges and a front section extending off the front edge of the roof panel for covering the truck windshield. The cover includes a rear panel attached to the rear edge of the roof panel for covering the truck's rear window. Attached to the side edges of the roof are two side sections for covering the vehicle's side windows, the side sections have a lower edge, a lower front corner and a back corner. The device includes two elastic strips. Each elastic strip has a first end and a second end. The first end of each of the elastic strips is individually attached to the lower edge of each of the side sections proximate the front corner. The second end of each strip is attached to the lower edge of each of the side sections proximate the back corner for detachably attaching the truck cover to the cab of a truck.

The device of the present invention and its use may be readily understood with reference to its use as a temporary truck cover to protect the vehicle from the elements of nature such as snow or sunlight.

These and other objects, features and advantages of the present invention will become readily apparent to those having ordinary skill in the art upon a reading of the following detailed description in view of the appended claims and drawings.

DETAILED DESCRIPTION OF THE PREFERRED EMBODIMENT

Figure 1:
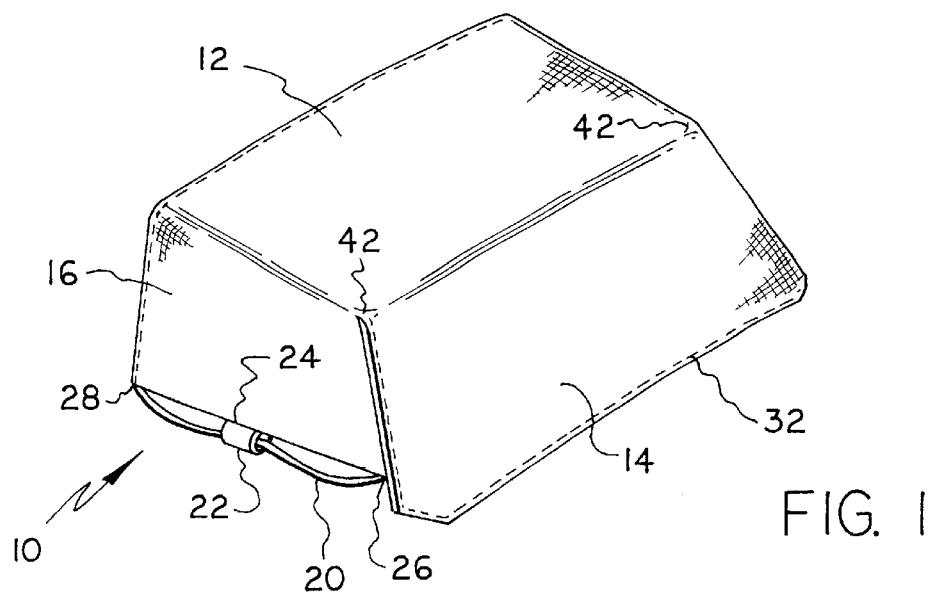
FIG. 1 is a front perspective view of the present invention.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. §112.

This invention is a storable cover for covering the cabin portion of a pick up truck. The cover incorporates fabric panels and a fastening means suitably sized so that one person can easily attach the detachable cover to a vehicle.

This cover permits people to park their vehicle outside and still protect the windows from sun, snow and ice. When a vehicle is left outside for any period of time snow and ice collects on the windshield and must be removed prior to operating the vehicle. The cover of the present invention protects the windows from accumulating frost and snow, saving the user time and trouble of scraping the windows of the vehicle. The cover is lightweight and of a size easily detached by one person and stored within the vehicle after use. Any snow or ice accumulated on the cover can be easily shaken free prior to storage. The cover also acts as a sunshade to prevent sunlight from entering the interior of the vehicle and creating a "greenhouse effect" in the passenger compartment. The cover also protects the interior of the vehicle from heat and sun damage.

Adverting now to the drawings, with reference to FIG. 1, a preferred embodiment of the cover of the present invention is indicated generally by numeral 10. Truck cover 10 has dimensions suitable for covering a cab or passenger compartment of a typical midsize pick up truck with an open bed. Truck cover 10, is comprised of a roof panel 12 that includes front section 14 and side sections 16. In use, truck cover 10 is spread over the corresponding front and rear windows and two side windows of the vehicle. Roof panel 12 is the portion of the cover that protects the roof, and front section 14 covers the windshield of a vehicle. Two side sections 16 are provided to cover both side windows (only one side section is shown, however both side sections are identically situated in both size and shape). Roof panel 12 is a generally rectangular shaped panel of tightly woven polyester fabric. Extending from the front of roof panel 12 is front section 14, which extends below the side sections and covers the windshield including the lower portion of the front window and part of the hood of a vehicle while the device is in use. At front corner 26 and back corner 28 of side sections 16 there is provided an attachment means in the form of elastic strip 20 (one-inch polyester covered non-roll elastic). Each elastic strip has two ends, and is connected at one end to the front corners of each side sections, and at the other end to the back corner of the side sections. Elastic strips 20 are arranged to extend in a longitudinal direction along the bottom of the each side section 16 and remain substantially parallel to the lower edge of the side sections so as to become almost flush with the lower edge. The elastic strips provide an adequate connection mechanism linking the cover and the vehicle body. The elastic strips 20 are fixed to the cover by using any suitable method, for example, by stitching or use of an adhesive. In this preferred embodiment, loops 22 are fixedly attached to side sections at connection points 24 and have an opening of an adequate dimension to accommodate the passing of elastic strips 20 (comprised of about a one-inch polyester webbing) through the loops. The elastic strips are configured to slide freely through the loops. The loops are made of nylon and can be as thin as a shoelace or can extend out cylindrically for a few inches as depicted in FIG. 1. The loops hold the strip in a longitudinal position proximate the lower edge of the cover. In a preferred embodiment of the invention, the truck cover is comprised of a sheet of tightly woven polyester fabric, for example a polyester, a nylon backed polyurethane or a polyamide, which has been treated or laminated on one side, in this case the outside of the cover, with a waterproofing material. Alternative sheet materials could be used providing that they are resistant to tearing and resistant to stretching.

Figure 2:
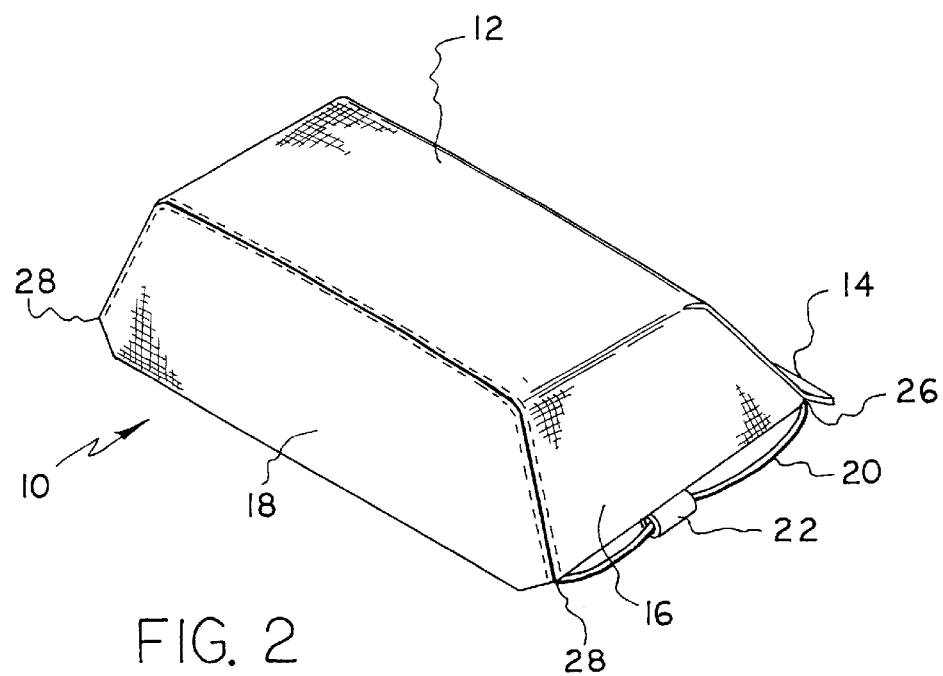
FIG. 2 is a rear perspective view of the present invention.

FIG. 2 is a rear perspective view of a cover for a passenger compartment of a truck. Roof panel 12, side sections 16 and rear panel 18 are aligned evenly together and the rear panel is connected along the entire rearward edge of the side sections and roof panel 12 from and to back corners 28. The lower edges of the entire cover are configured with sewn hem 32 (a one inch hem sewn with polyester thread). Although the truck cab cover of the preferred embodiment is formed from individual panels, it should be readily understood by those skilled in the art, the cover does not have to be formed from separate panels but can also be constructed as a single fabric sheet. Also, it should be appreciated that the cover can be pieced together from a greater number of separate pieces. Fixedly attached to each of the two side sections 16, is a fastening means or strapping assembly such elastic strip 20 comprised of polyester elastic webbing.

Figure 3:
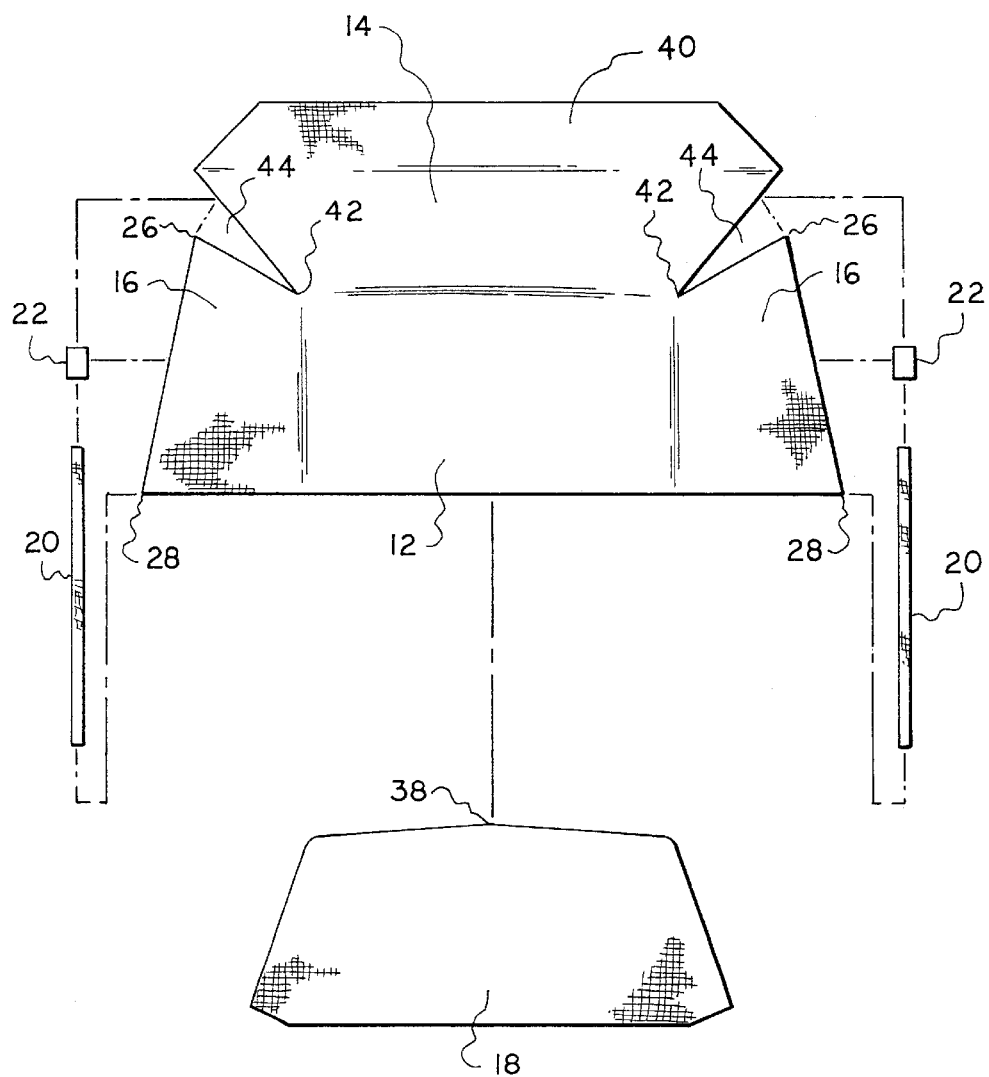
FIG. 3 is an exploded view of the present invention.

FIG. 3 is an exploded view of a vehicle cover in accordance with the present invention. Truck cover 10 is used in conjunction with a midsize truck having a wheelbase of approximately of 110 to 125 inches. For a midsize truck, a cover measures about 104-inches from back corner 28 of a side section 16 across the lower edge of roof panel 12 to back corner 28 of the other side section. Roof panel 12 is a generally rectangularly shaped sheet of fabric having two side sections 16 which extend outwardly approximately 24 inches from the sides of the rectangle and front section 14 that extends outwardly approximately 30 inches from the front of roof panel 12 and is meant to cover the windshield and extends onto the hood of the truck when in use. The side sections and front panel extend from roof corners 42, and are aligned on opposite sides of open dart 44, the side and front panels are edge matched and sewn together from roof corners 42 to front corners 26. Front section 14 is configured to fan out over the windshield and onto the hood. Tail 40 is the portion of front section 14 which spreads out over the lower edge of the windshield and onto a portion of the truck's hood.

Rear panel 18 is configured with top rounded edge 38, which provides additional space to the cover so as to accommodate a truck that is equipped with a bed lamp or to accommodate a truck cab with additional volume. Roof panel 12 is centered to the top rounded edge 38 of rear panel 18. Rear panel 18 has a generally rectangular configuration and is attached to roof panel 12 and side sections 16. The three attached sides of rear panel 18 total a length of approximately 104 inches and mate to side sections 16 and to lower edge of roof panel 12 from back corner 28 to back corner 28. The lower edge of rear panel 18 measures approximately 72 inches. Truck cover 10 will conform to the shape of the roof of the vehicle 30.

It should be appreciated that the dimensions can be increased by approximately 11% in order to fit full sized trucks having a wheelbase of between approximately 130 to 145 inches. In addition, roof panel 12 can be enlarged to accommodate a vehicle with a larger cab, for example a compact truck with an extended cab would require a roof panel with an additional 18 to 24 inches in length. The dimensions provided above are for reference purposes only. It should be understood other combinations of dimensions are also possible. It should be appreciated that the dimensions of the front panel, the side sections and the rear panel in general can vary to accommodate different sized vehicles.

The simple and efficient shape of the individual panels can be easily manufactured and connected to each other. In this embodiment, truck cover 10 is made of a tightly woven polyester fabric. It should be appreciated that other suitable materials, other than tightly woven polyester fabrics can be used in the manufacture of truck cover 10 such as canvas, plastic, nylon web, wax coated fabric or the like for example.

Figure 4:
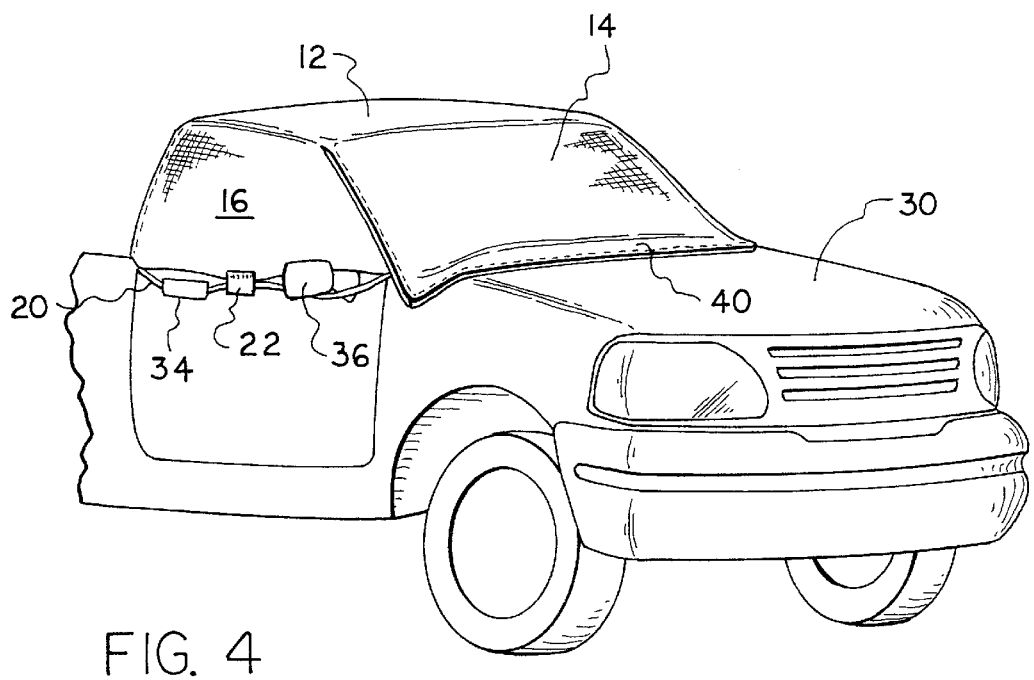
FIG. 4 is a view of the truck cover the present invention in place on a passenger compartment of a truck.

FIG. 4 is a view of the preferred embodiment of the invention in place on a truck. In use the cover is fully opened up and placed over the top of vehicle such that two side sections 16 and elastic strips 20 are proximate to the sides of the vehicle, front section 14 covers the windshield and rear panel 18 covers the rear window. Secured in place the entire cover is substantially in contact with the vehicle. The shape of the roof panel 12 will conform to the shape of the roof of vehicle 30. The elastic strips 20 are detachably secured to a convenient part of the vehicle such as door handle 34 and mirror 36. Elastic strips 20 are looped under both the rear view mirror and the door handle to hold truck cover 10 in place tight across the windshield of the vehicle. In a preferred embodiment, loop 22 is attached at the center of the bottom edge of side sections 16, in this preferred embodiment, approximately 20 inches from back corners 28 of side sections 16. Loop 22 is fixedly attached to side sections at connection point 24 allowing elastic strips 20 to be passed through the loops and retained at the bottom of the cover.

By way of example, the cover is secured to the vehicle by pulling the sides of the cover such that the cover is taught. Front section 14 is shown covering the top of the truck's hood. Front section 14 extends out further from roof panel 12 than two side sections 16. This longer portion forms tail 40, which spreads out over the lower edge of Is the windshield and onto a portion of the truck's hood. A wiper blade may be placed over the tail during use for a more secure attachment (not shown in drawings). This aids in holding the cover on the car in windy weather.

As will be appreciated, the present invention provides a sound and effective truck cover that can be readily attached to any sized and shaped vehicle. The invention overcomes some of the deficiencies in the prior art by allowing for the efficient connectivity and removal of the vehicle cover. As can be readily understood the present invention will protect the windows from accumulating frost and snow, saving the user time and trouble of scraping the windows of the vehicle. The device also acts as a sunshade to prevent sunlight from entering the passenger compartment and creating a "greenhouse effect" in the interior of the vehicle and thus protecting the interior from heat and light damage.

While the present invention has been described with reference to the specific embodiments above, other modifications could be made without departing from the scope of the present invention. For example permanent fixing of the components may be accomplished by a variety of methods such as stitching, use of adhesives or other suitable alternatives. Temporary fixing could be effected by appropriate methods for example by use of press fasteners, zippers, lacing or Velcro. Various components of the cover could be made from suitable materials which are different to those specifically mentioned.

IN GENERAL

While a preferred form of this invention has been described above and shown in the accompanying drawings, it should be understood that applicant does not intend to be limited to the particular details described above and illustrated in the accompanying drawings, but intends to be limited only to the scope of the invention as defined by the following claims. In this regard, the term "means for" as used in the claims is intended to include not only the designs illustrated in the drawings of this application and the equivalent designs discussed in the text, but it is also intended to cover other equivalents now known to those skilled in the art, or those equivalents which may become known to those skilled in the art in the future.

What is claimed is:

1. A truck cover comprising:

a roof panel having a front edge, a rear edge, and two side edges;

a front section attached to said front edge of said roof panel for covering a vehicle's front window;

a rear panel attached to said rear edge of said roof panel for covering a vehicle's rear window;

two side sections attached to said side edges of said roof panel for covering a vehicle's side windows; said side sections having a lower edge, a front corner and a back corner;

two elastic strips having a first end and a second end; said first end of each of said elastic strips is individually attached to said lower edge of respective said side sections proximate said front corner and said second end is attached to said lower edge of respective said side sections proximate said back corner for detachably attaching said truck cover to a vehicle; and a connection means attached proximate said lower edge of each of said side sections between said front corner and said lower rear corner; said connection means is operatively arranged to slideably engage and hold said elastic strips substantially parallel to said lower edge of said side sections.

2. The truck cover according to claim 1 is comprised of a tightly woven polyester fabric.

3. The truck cover according to claim 2 wherein said elastic strips are comprised of one-inch polyester webbing.

4. The truck cover according to claim 3 wherein said connection means is comprised of a loop of nylon.

5. The truck cover according to claim 4 wherein said rear panel has a rounded upper edge.

* * * * *